United States Patent [19]
Koch et al.

[11] Patent Number: 4,673,499
[45] Date of Patent: Jun. 16, 1987

[54] WATER SEPARATOR AND FILTER FOR LIQUID HYDROGENS

[75] Inventors: Paul Koch, Oberursel; Eberhard von Künszberg, Bad Homburg, both of Fed. Rep. of Germany

[73] Assignee: Faudi Feinbau GmbH, Oberursel, Fed. Rep. of Germany

[21] Appl. No.: 361,456

[22] Filed: Mar. 24, 1982

[30] Foreign Application Priority Data

Nov. 20, 1981 [DE]  Fed. Rep. of Germany ....... 3145964

[51] Int. Cl.⁴ .............................................. B01D 25/02
[52] U.S. Cl. .................................. 210/295; 210/314; 210/316; 210/339; 210/DIG. 5
[58] Field of Search ................. 210/DIG. 5, 799, 806, 210/316, 339, 295, 314, 323.2

[56] References Cited

U.S. PATENT DOCUMENTS 2,757,803  8/1956  Robinson et al. ............ 210/DIG. 5
2,929,503  3/1960  Ambruster, II et al. ..... 210/DIG. 5
3,929,641  12/1975  Dukek ........................... 210/DIG. 5

FOREIGN PATENT DOCUMENTS 987132  3/1965  United Kingdom ......... 210/DIG. 5

Primary Examiner—Benoit Castel
Attorney, Agent, or Firm—Michael J. Striker

[57] ABSTRACT

A filter and water separator for use with liquid hydrocarbons such as aircraft fuel includes a horizontally directed housing and within the housing a first set of filtering and coalescing elements connected to the inlet port of the housing and a parallel arranged set of separating elements arranged parallel to the filtering elements and communicating with the outlet ports in the housing. Each separating element is provided in its interior with a coaxially arranged hollow cylinder communicating at one end with the outlet port and having an inlet opening at its opposite end. The cylindrical wall of the hollow cylinder is formed with a plurality of inlet openings, the combined cross-section of which increases from the end face inlet opening toward the outlet port. Liquid flowing from the filtering and coalescing elements impinges at an oblique angle against the separating elements and the separated water drops are directed to a quieting zone at the end of the housing opposite the inlet and outlet ports wherefrom the droplets fall into a water sump.

3 Claims, 2 Drawing Figures

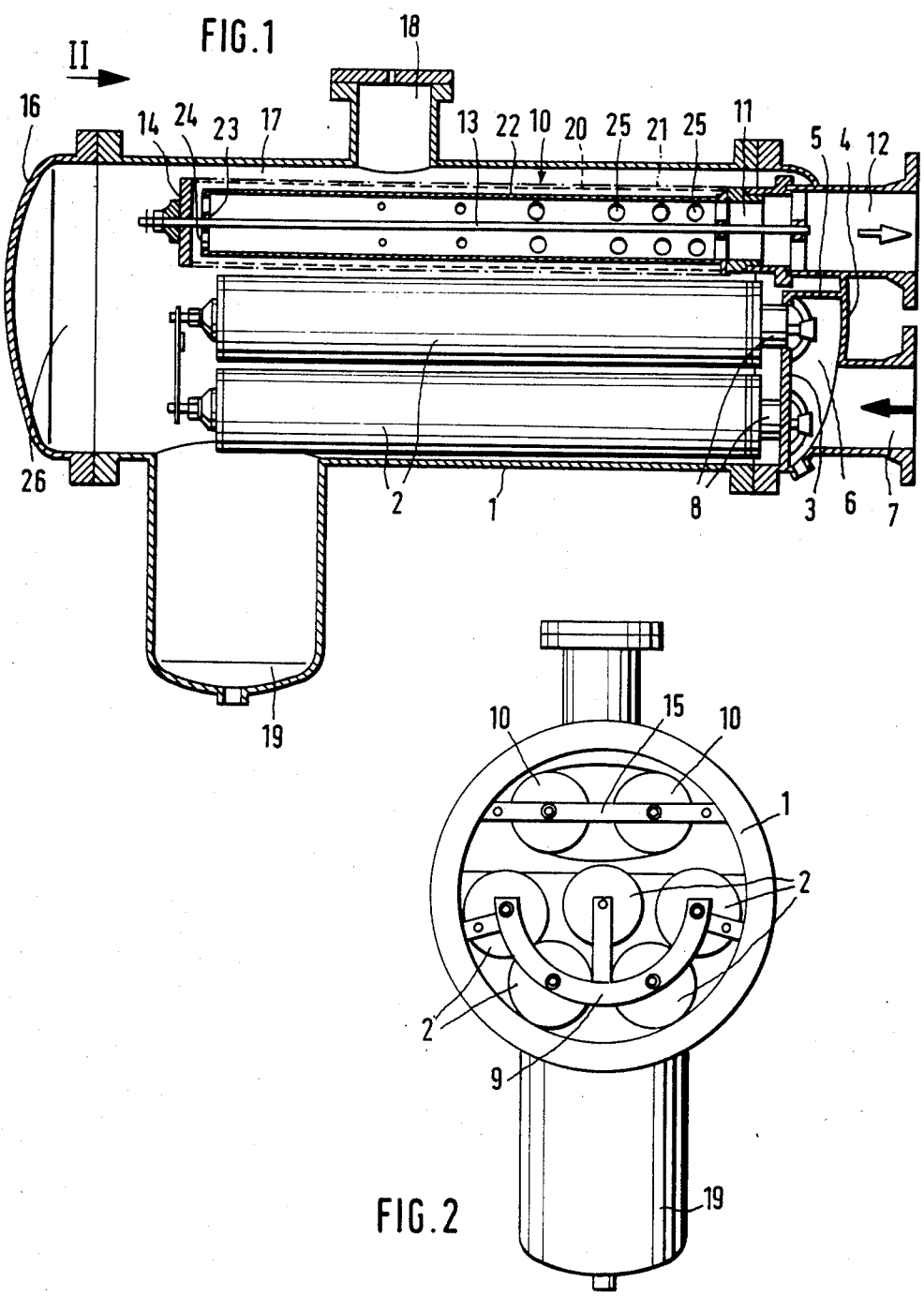

WATER SEPARATOR AND FILTER FOR LIQUID HYDROGENS

BACKGROUND OF THE INVENTION

The present invention relates in general to a device for separating water and filtering pollutants from liquid hydrocarbons, particularly a gas fuel. The device is of the type having a substantially horizontal housing enclosing at least one cylindrical filtering and coalescing element and at least one cylindrical water separating element, the elements being arranged in horizontal direction parallel to each other. Liquid hydrocarbons flow from an inlet port at one end of the housing into the filtering and coalescing element from which they are discharged into the interior of the housing and enter from the outside the water separating element from which they are discharged into an outlet port arranged at the same one end of the housing.

Conventional devices of this kind which are also designated as filtering water separators, serve for a very fine filtration and separation of free water particles, that means particles which are not dissolved in hydrocarbons. Such devices are employed in mobile or stationary fuel filling stations such as a gassed fuel, for example. In such stations, very high standards are to be met as regards the filtering quality and the phase separating quality of the employed filtering and separating elements. Further fields of application of such devices are for example in chemical, particularly in petrochemical industry.

In the known device, the first stage consisting of one but mostly of a plurality of filtering and separating elements, the emulsion containing water and liquid hydrocarbons is broken down whereby finely divided water particles coalesce into large drops. At the same time, the finest pollutant particles are filtered.

In the second stage consisting of one or more separating elements there are employed boundary surface materials of separating or dissociating quality, such as hydrophobic materials which are impermeable to water but permeable to hydrocarbons so that water drops are blockhead before the inflow of the hydrocarbon liquid into the separating element. The separated water drops are collected in a sump basin at the bottom of the housing and are periodically withdrawn therefrom.

The application of such devices in mobile fuel filling equipment necessitates a space-saving construction which at the same time permits a high through-flow rate. Inasmuch as extremely high filtering efficiency and particularly high water separating efficiency is required, the design of the flow conditions and flow distribution in the interior of the housing and primarily along the cylindrical filtering and coalescing elements and along the separating elements is of great importance.

From the contradictory requirements that a high flow rate of the fuel is to be achieved and at the same time any entrainment of water particles into the separating elements due to the excessive flow is to be prevented, it has been found during the development of a known device of this kind (German Pat. No. 1,645,749) that a substantially uniform flow rate of the treated liquid is to be adjusted over the entire length of the separating elements. Conventional devices of this type use a vertical orientation of the separating elements and in order to achieve such a uniform flow a hollow cylinder was inserted into the separating element which at one end thereof was closed by the lid of the separating element and at its other end was in communication with the outlet port of the housing whereby the jacket of the hollow cylinder was provided with a plurality of inlet openings decreasing in size from the closed end to the outlet end.

The objectives of this above-described provision of the hollow cylinder in the separating element was to obtain a uniform through-flow rate over the entire upper surface of the separating element and from the standpoint of surface loads such uniform flow speed should be optimal. Nonetheless, the prerequisite condition is that a uniform flow toward the outer surface of the separating element and an unobstructed discharge of collected water on the upper surface of this element be always fulfilled.

In practice, however, the two preconditions are not met at all or are satisfied only insufficiently.

In view of present-day requirements to construct such devices with high through-flow efficiency at small size of the device, a very compact arrangement of the filtering and separating elements in the housing is necessary. The spacing between the individual elements is frequently only in the magnitude range of the diameter of water drops coalescing during the operation on the element. As a consequence, the sedimentation and the downward movement of the water drops are obstructed. The elements of the first stage which are mostly arranged in the lower part of the housing are superimposed in several planes, and for achieving the required flow rate, a relatively strong stream directed upwardly to the second stage is adjusted which counteracts the downward movement of the water drops. Furthermore, the fact is to be taken into consideration that the inlets of the filtering and coalescing elements in the first stage are always at one end of these elements and consequently the flow is not discharged uniformly over the entire length of these elements of the first stage but is stronger in the vicinity of the inlet end. Such a stream which is increased at one end of the elements in the first stage before impinging against the elements of the second stage diminishes the effectiveness of the aforedescribed measures applied to conventional devices in order to achieve a uniform flow rate.

Moreover, it is to be also considered that a uniform, radially directed flow attempted in prior-art devices contributes in considerable degree to compression of entrained water drops in perpendicular direction against the outer surface of the separating element so that these drops are effectively retained thereon. This retention, however, reduces the separating efficiency.

SUMMARY OF THE INVENTION

It is, therefore, a general object of the present invention to overcome the aforementioned disadvantages.

More particularly, it is an object of the invention to provide an improved filtering and separating device of the aforedescribed kind which has a horizontal construction, a high flow rate and is spacially compact and at the same time the discharge and removal of the water drops from the separating elements is substantially improved.

In keeping with these objects and others which will become apparent hereafter, one feature of the invention resides, in a water separator and a pollutant filter of the abovedescribed type, in the provision of a hollow cylinder in the separating element which forms an interspace with the inner wall of the separating element and which at one end thereof communicates with the outlet port of the housing and at the opposite end face has openings permitting inflow of separated hydrocarbon liquid.

By this means a flow of treated liquid hydrocarbons is achieved within the housing which from the intake of the first stage of filtering element to the opposite end of the second stage of the separating element is not directed perpendicularly to the upper surface of the separating element and does not flow the shortest path of streaming. The stream impinges now obliquely against the upper surface of the separating element and consequently exhibits flow components which extend along the separating element and are directed away from its discharge end. By contrast to a uniform flow towards the separating element attempted in prior-art devices, the entrained water drops are not retained in the range of the second stage but are taken away toward the end of the separating element which is opposite the outlet end. In the vicinity of the latter end a zone of reduced or almost absent flow is created within the housing. This quieting zone may still be increased by structural measures such as, for instance, by the provision of a lid of the housing which is provided with a strike plate or clapper bottom. In any case the water drops reaching the striking zone move freely downwardly without encountering any opposite stream or without being obstructed by side-by-side arranged filtering elements. In contrast to uniform, perpendicularly directed stream impinging against the separating element and taking into account only the stream of fuel liquid penetrating the separating elements, the oblique flow against the separating element in the device of this invention causes that no water can penetrate through the water separating layer of this element. Instead, a stream of water drops builds up on the second stage and flows in the direction toward the quieting zone adjoining the opposite end of the housing when viewed in the direction of inlet and outlet ports.

In addition, this oblique stream reduces the speed of intake of water droplets against the water repelling layer of the separating element so that the separating effect is favorably influenced. Due to the fact that water drops during this oblique flow do not adhere to the active surface of the separating element, or at least do not remain there over a significant time period, no reduction of the effective throughflow surface due to the retained water drops will occur. The flow components directed to the quieting zone at one end face of the housing has the effect that water drops which do not immediately sink into the sump from the first stage but are moved toward the second stage, do not reach in substantial amounts the separating element but are conveyed by longitudinal channels resulting between the cylindrical surfaces of adjacent filtering and coalescing elements to the quieting zone. The latter feature is of particular advantage in the devices in which the elements for space-saving reasons are so tightly arranged relative to each other that water drops between the elements cannot fall downwardly.

The above-described advantages are preserved also in those constructions in which the first stage of elements is positioned above or side-by-side with the second stage of elements.

In a particularly advantageous embodiment of this invention the hollow cylinder in the separating element is provided with additional inlet openings in the cylindrical wall of the hollow cylinder which is made of an impervious material whereby these openings increase in size from the inlet toward the outlet of the hollow cylinder.

In this manner, an excessively strong streaming in the range of the open end of the hollow cylinder is neutralized. By means of a simple adjustment of the cross-section of the inlet openings at the end of the hollow cylinder in the separating element to the cross-section and number of inlet openings in the cylindrical wall of the hollow cylinder, it is possible to obtain for each mode of application an oblique, but at the same time approximately uniformly distributed flow against the separating element.

In a further embodiment of this invention the above-mentioned adjustment of the distribution and sizes of the inlet openings in the hollow cylinder is achievable in a very simple manner by the provision of an end diaphragm in the inlet opening in the end face of the hollow cylinder.

The novel features which are considered as characteristic for the invention are set forth in particular in the appended claims. The invention itself, however, both as to its construction and its method of operation, together with additional objects and advantages thereof will become apparent from the following description of specific embodiments when read in connection with the accompanying drawings.

BRIEF DESCRIPTION OF THE DRAWINGS

FIG. 1 is a sectional side view of a filtering and water separating device of this invention; and FIG. 2 is an elevational view in the direction of arrow II of the device of FIG. 1 with the housing removed.

DESCRIPTION OF THE PREFERRED EMBODIMENTS

A horizontally directed housing 1 contains in its lower part a group of five cylindrical filtering and coalescing elements 2 arranged side-by-side and one above the other. These known filtering and coalescing elements 2, which will not be described in detail, consist essentially of several layers of different materials functioning as filtering layers for retaining minute pollutants and also acting as water coalescing layers. The coalescing layers cause a unification of extremely finely divided water particles into larger water drops.

The elements 2 of the first filtering and coalescing stage define an open end which communicates through an end face 3 of the housing with an inlet chamber 6 which is bounded by a partition 5 in a first housing lid 4 and communicates with an inlet port 7. Each inlet opening 8 of the filtering and coalescing elements 2 thus receives the incoming hydrocarbon liquid to be treated and discharge the same through its cylindrical wall outwardly into the interior of housing 1.

The opposite ends of respective filtering and coalescing elements 2 are closed and supported in the housing by means of a supporting structure 9.

In the upper part of the housing 1, the separating elements 10, forming the second stage, are arranged above the elements 2 of the first stage. One end of each element 10 is open and is connected to the rim of the outlet port 12 in the housing. A central mounting rod 13 holds a closing lid 14 at the other end of the element 2 and these other ends are also held in a fixed position relative to each other and supported in the housing 1 by means of a support 15.

The end face of housing 1 opposite the inlet and outlet ports is formed by a removable housing lid 16 which enables after its removal the access into the inner space 17 of the housing. In this manner the elements 2 and 10 can be replaced. A venting connection piece 18 with a non-illustrating venting device is provided on the top side of housing 1. The bottom side of the housing is formed with a water sump 19 located approximately below the free end of elements 2 and 10 for collecting water drops from the outer surfaces of these elements. Water sump 19 is provided with an outlet through which the collected water is periodically removed. Separating elements 10 through which the hydrocarbon liquid flows from the outside into the inside have an outer supporting grid 20 adjoining at least some hydrophobic separating layer 21 which permits the through flow of hydrocarbon but retains water drops.

An impervious hollow cylinder 22 having a smaller outer diameter than the inner diameter of the separating elements 10 is coaxially arranged within the separating element 10. The hollow cylinder 22 is made preferably of metal and communicates at one end thereof with the outlet 11 of the separating element 10 and with the outlet port 12 of the housing. The opposite end of hollow cylinder 22 which is spaced apart from the lid 14 of element 10 is provided with a front diaphragm 23 defining inlet openings 24. In addition, the cylindrical wall of cylinder 22 is provided with an array of inlet openings 25 having different cross-section areas wherby the size of these openings 25 increases toward the open outlet end of the cylinder 22. The total cross-section of the inlet openings 25 when considered relative to the length of the housing cylinder 22 may be also increased by the provision of a larger number of these openings in the vicinity of outlet 11.

The liquid hydrocarbon such as aircraft fuel, for example, exiting from the filtering and coalescing elements 2 of the first stage and entraining at least a part of the coalescent water drops, is directed obliquely toward the housing lid 16 and also impinges at an oblique angle against the outer surface of the superimposed separating elements 10 in the second stage. The liquid hydrocarbon, such as aircraft fuel is permeable to the separating hydrophobic layer 21 and enters the annular interspace 22 a between the element 10 and the cylinder 22 wherefrom it flows through the end inlet opening 24 and the peripheral inlet openings 25 of cylinder 22 toward the housing outlet port 12. The separated water drops due to flow components directed along the upper surface of elements 10 are conveyed in the direction toward the lid 16 into an end space 26 which constitutes a quieting zone where no or a neglible streaming occurs. In this quieting zone 26, the separated water drops move downwardly and are connected in the water sump 19.

It will be understood that each of the elements described above, or two or more together, may also find a useful application in other types of constructions differing from the types described above.

While the invention has been illustrated and described as embodied in a device for use with aircraft fuel, it is not intended to be limited to the details shown since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A device for separating water and filtering pollutants from liquid hydrocarbon, comprising a substantially horizontally directed housing provided at one end thereof with an inlet port and with an outlet port for the treated hydrocarbons; at least one tubular filtering and coalescing member having one open end connected to said inlet port, and a closed end supported within the housing; at least one tubular water separating member arranged parallel to said filtering and coalescing member and having one open end connected to said outlet port, and a closed opposite end supported in said housing; and an inner tubular member coaxially arranged in said separating member to form an annular interspace therein, one end of said inner member communicating with the outlet port and the other end of said inner member being provided with inlet openings for passing the separated hydrocarbons from said interspace to said outlet port; said inner tubular member being provided with a plurality of inlet openings on its jacket and the combined cross-sections of said openings per a length unit increasing in the direction from the closed end of the separating member towards its outlet end.

2. A device as claimed in claim 1, wherein said inner tubular member is of an impervious material.

3. A device as defined in claim 1, wherein the inlet opening at the other end of said inner tubular member is in the form of a front diaphragm.

* * * * *